US005149463A

United States Patent [19]

Peterson

[11] Patent Number: 5,149,463

[45] Date of Patent: Sep. 22, 1992

[54] THICKENED ACIDIC LIQUID COMPOSITION WITH SULFONATE FWA USEFUL AS A BELACHING AGENT VEHICLE

[75] Inventor: David Peterson, Pleasanton, Calif.

[73] Assignee: The Clorox Company, Oakland, Calif.

[21] Appl. No.: 342,800

[22] Filed: Apr. 21, 1989

[51] Int. Cl.[5] ........................ C09K 11/06; C11D 3/39; C11D 9/42; C11D 3/42

[52] U.S. Cl. ............................... 252/301.21; 252/102; 252/174.21; 252/174.23; 252/186.29; 252/301.23; 252/315.01; 252/547; 252/558; 252/559; 252/DIG. 1; 252/DIG. 7; 252/187.27

[58] Field of Search ................... 252/95, 100, 102, 98, 252/96, 99, 102, 187.24, 187.25, 187.26, 187.27, 187.28, 187.33, 174.23, 174.24, 301.21, 301.23, DIG. 7

[56] References Cited

U.S. PATENT DOCUMENTS

| | | | |
|---|---|---|---|
| 3,393,153 | 7/1968 | Zimmerer et al. | 252/95 |
| 3,499,844 | 3/1970 | Kibbel, Jr. et al. | 252/186.29 |
| 4,282,109 | 8/1981 | Citrone et al. | 252/102 |
| 4,421.902 | 12/1983 | Chang et al. | 252/174.24 |
| 4,429,097 | 1/1984 | Chang et al. | 252/174.24 |
| 4,529,773 | 7/1985 | Witiak et al. | 524/558 |
| 4,552,685 | 11/1985 | Kernstock et al. | 252/355 |
| 4,685,931 | 8/1987 | Schieferstein et al. | 8/406 |
| 4,764,302 | 8/1988 | Baker et al. | 252/301.23 |
| 4,839,077 | 6/1989 | Cramer et al. | 252/95 |

FOREIGN PATENT DOCUMENTS 0209228 1/1987 European Pat. Off. .

OTHER PUBLICATIONS

"Acrysol ®ICS-1 Thickener—for use in Cosmetic and Toiletry Products", 1983, pp. 1-16, Rohm and Haas Company.

"Acrysol ®ICS-1 Thickener—for use in Household and Industrial Cleaners", 1983, pp. 1-16, Rohm and Haas Company.

"Acrysol ®RM-5", 1985, pp. 1-8 *Polymers, Resins and Monomers*, Rohm and Haas Company.

*Primary Examiner*—Prince Willis, Jr.
*Assistant Examiner*—John F. McNally
*Attorney, Agent, or Firm*—Majestic, Parsons, Siebert & Hsue

[57] ABSTRACT

A liquid laundry product which thickens in the acidic pH range by combination of a copolmer containing carboxylic acid groups, a relatively small amount of an amphoteric surfactant or amine oxide, and a soluble sulfonate which is a fluorescent whitening agent or a hydrotrope. The composition may also contain a peroxide bleaching agent.

14 Claims, No Drawings

THICKENED ACIDIC LIQUID COMPOSITION WITH SULFONATE FWA USEFUL AS A BLEACHING AGENT VEHICLE

FIELD OF THE INVENTION

The present invention generally relates to liquid bleaching compositions, and more particularly to a thickened acidic liquid composition having dissolved sulfonate brightener or hydrotrope that may also include a bleach effective amount of bleaching agent.

BACKGROUND OF THE INVENTION

Some consumers are believed to show a preference for thickened cleaning or brightening compositions and thickened cleaners are useful, for example, as oven cleaners, paint strippers and toilet bowl cleaners as they can be more readily positioned upon the area being cleaned. Additives for thickeners have included natural gums such as guar and locust bean extract, starches and cellulose and their derivatives.

Polymeric thickeners for acidic surfactant compositions are described by U.S. Pat. No. 4,552,685, issued Nov. 12, 1985, inventors Kernstock et al. and by U.S. Pat. No. 4,529,773, issued Jul. 16, 1985, inventors Witiak et al. However, these acidic-thickened solutions require high levels of surfactant in order to solubilize the copolymers and they have higher viscosities at pH 7 than when the pH is lowered into the acidic region.

SUMMARY OF THE INVENTION

In one aspect of the present invention, a thickened acidic liquid composition is provided that preferably includes a solubilized fluorescent whitening agent as part of the thickener and a bleaching agent, and thus is useful as a laundering aid. The composition comprises an aqueous solution having a pH below about 6 and a thickener in an amount effective to thicken the aqueous solution to a desired viscosity. This thickener is dissolved in the aqueous solution and the composition can be formulated to be substantially clear. The thickener includes a copolymer containing an $\alpha,\beta$-ethylenically unsaturated carboxylic acid, either a fluorescent whitener having sulfonate groups or a hydrotrope with sulfonate groups, and a relatively small amount of an amphoteric surfactant or an amine oxide.

When fluorescent whitening agent (FWA) is present in the thickened acidic liquid composition, use can be made as a laundering aid since once the composition is diluted and neutralized in the washing solution, then the FWA is substantive and performs a brightening function. A particularly preferred embodiment includes a bleaching agent such as a source of peroxide in a bleach effective amount.

DETAILED DESCRIPTION OF THE PREFERRED EMBODIMENTS

Compositions of the invention are thickened with three essential components, or component types. The three components are (a) a copolymer of an $\alpha,\beta$-ethylenically unsaturated carboxylic acid, (b) either a fluorescent whitener having sulfonate groups or a soluble hydrotrope having sulfonate groups, and (c) relatively small amounts of an amphoteric surfactant or an amine oxide. It is believed that at the acidic pH of the inventive compositions (with a pH below about 6) the copolymer complexes with the amphoteric surfactant or amine oxide, which in turn complexes with the hydrotrope or whitener. Each of the three necessary component types will now be more specifically described.

COPOLYMER

The copolymer must include an $\alpha,\beta$-ethylenically unsaturated carboxylic acid such as methacrylic acid or acrylic acid. Such monomers must be copolymerized because polyacrylic acids and the like cross-linked homopolymers do not serve as adequate substitutes for the copolymeric component. Particularly preferred copolymers are derived from methacrylic acid or acrylic acid and a methacrylic or acrylic acid ester. The copolymer component should be from about 0.01 wt. % to about 1 wt. %, more preferably from about 0.1 wt. % to about 0.5 wt. %, of the total composition. Table IA illustrates the criticality of the copolymeric component in thickening compositions of the invention. Table IB shows that the homopolymer or cross-linked homopolymer cannot be substituted for the copolymeric component.

TABLE IA

| Components | Wt. % | pH | Viscosity (cps) |
|---|---|---|---|
| Inventive Composition (a) | | 4.50 | 426 |
| Copolymer[1] | 0.25 | | |
| FWA[2] | 0.26 | | |
| Amine oxide[3] | 0.25 | | |
| $H_2O_2$ | 3.50 | | |
| Optional (nonionic surfactant[4], chelating agent[5]) | (2,0.12) | | |
| Remainder water | | | |
| Comparative Composition (a) | | 4.50 | 10 |
| Copolymer[1] | 0.00 | | |
| FWA[2] | 0.26 | | |
| Amine oxide[3] | 0.25 | | |
| $H_2O_2$ | 3.50 | | |
| Optional (nonionic surfactant[4], chelating agent[5]) | (2,0.12) | | |
| Remainder water | | | |

[1]Acrysol RM-5 (Rohm & Haas)
[2]Tinopal CBS (Ciba-Geigy)
[3]Ammonyx MCLO (Stepan Co.)
[4]Neodol 25-7 (Shell Chemical)
[5]Dequest 2000 (Monsanto)

As may be seen from the data of Table IA, omission of the copolymer in comparative composition (a) resulted in a composition with a viscosity of 10 cps. That is, substantially no thickening was achieved without copolymer. By contrast, inventive composition (a) resulted in a thickened composition having a viscosity of 426 cps. This means that the copolymer of the inventive composition (a) dissolved and was sufficiently swollen in the acidic aqueous liquid to cause thickening. The viscosity measurements were taken using conventional techniques with a Brookfield Viscometer, model LVT, using spindle no. 2 at 20 rpm and 24° C.

Compositions of the invention should have a viscosity between about 50–1,000 cps, more preferably about 100 to 600 cps. The inventive composition (a) thus had good thickening with relatively little surfactant present (2 wt. % nonionic surfactant and 0.25 wt. % amine oxide) and illustrates a substantially clear, thickened acidic laundering aid composition.

TABLE IB

| Components | Wt. % | pH | Viscosity (cps) |
|---|---|---|---|
| Comparative Composition (b) | | 5.00 | 5 |
| Homopolymer[a] | 0.25 | | |

TABLE IB-continued

| Components | Wt. % | pH | Viscosity (cps) |
|---|---|---|---|
| FWA[2] | 0.26 | | |
| Amine oxide[3] | 0.25 | | |
| $H_2O_2$ | 3.50 | | |
| Optional (nonionic surfactant[4], chelating agent[5]) | (2.0.12) | | |
| Remainder water | | | |
| Comparative Composition (c) | | 5.00 | 5 |
| Cross-linked homopolymer[b] | 0.25 | | |
| FWA[2] | 0.26 | | |
| Amine oxide[3] | 0.25 | | |
| $H_2O_2$ | 3.50 | | |
| Optional (nonionic surfactant[4], chelating agent[5]) | (2,0.12) | | |
| Remainder water | | | |

[a]Polyacrylic acid. Acrysol A-3 (Rohm & Haas)
[b]Carbopol 941 (B. F. Goodrich)
[2]Tinopal CBS
[3]Ammonyx MCLO
[4]Neodol 25-7
[5]Dequest 2000

Turning to Table IB, comparative compositions (b) and (c) were substantially identical to inventive composition (a) except for the use of a polyacrylic acid component or a cross-linked polyacrylic acid. However, neither of the comparative compositions (b) and (c) was thickened.

Suitable copolymers are typically aqueous dispersions of water-insoluble, emulsion copolymers. In general, the emulsion copolymer dispersions commercially available have solids contents from 25 to 50% by weight, and the copolymer dispersion has a weight-average molecular weight of about 100,000 to several million. Such emulsion polymers can be obtained by aqueous emulsion copolymerization of the three following monomers, and optionally the fourth monomer, set forth below.

(1) Methacrylic acid or acrylic acid, (2) An acrylic or methacrylic acid ester of a $C_8$–$C_{30}$ alkyl, alkylaryl or polycyclic hydrocarbyl monoether of a polyethylene glycol having at least two oxyethylene units, preferably having 10 to 40 oxyethylene units, and having as many as 70 or so oxyethylene units, this ester being defined by the following general formula:

$$H_2C=C(R)—C(O)—O—(CH_2CH_2O)_n—R^1$$

wherein R is H or $CH_3$, the latter being preferred, n is at least 2, and preferably has an average value of at least 10, up to 40 to 60 or even up to 70 or so, and $R^1$ is a hydrophobic group, for example an alkyl, alkylaryl, or polycyclic alkyl group having 8 to 30 carbon atoms, preferably 16 to 18 carbon atoms, or having an average or 12 to 18 or more carbon atoms, (3) A $C_1$–$C_4$ alkyl acrylate or methacrylate, preferably ethyl acrylate, butyl acrylate or methyl methacrylate, and (4) Optionally, a small amount of a polyethylenically unsaturated monomer.

The relative proportions of the first three components fall in the broad range of (1) 20–50 wt. %, (2) 0–25 wt. %, and (3) at least 30 wt. %. The preferred ranges are (1) 35–45%, (2) 1–15% and (3) 40–60%. In component (2), R may be octyl ($C_8$), lauryl ($C_{12}$), tridecyl ($C_{13}$), myristyl ($C_{14}$), or pentadecyl ($C_{15}$), but preferably $C_{12}$ to $C_{18}$ or mixtures thereof, examples being lauryl, cetyl, palmityl, and stearyl. R may be alkylaryl, such as octyl and vinylphenyl, or polycyclic alkyl such as cholesterol and lanosterol.

Suitable copolymers as above described are commercially available from the Rohm and Haas Company under the trade name "Acrysol" and style designations ASE 108, RM-5, and ICS-1. These polymer emulsions are packed with an acidic pH and have the monomer compositions approximated by Table IC.

TABLE IC

| Polymer as | Monomer Composition | | |
|---|---|---|---|
| Commercially Available | Methacrylic Acid (Mole %) | Ethyl Acrylate (Mole %) | Surfactant Acrylate (n = 20, m = 15-17) |
| Acrysol RM-5 | 37 | 59 | 0.4 |
| Acrysol ICS-1 | 39 | 56 | 0.8 |
| Acrysol ASE 108 | 63 | 37 | — |

U.S. Pat. No. 4,552,685 also describes suitable copolymers for the invention where the copolymer has been derived from (a) an α,β-ethylenically unsaturated carboxylic acid, (b) a nonionic surfactant ester of a polyoxyalkalene derivative of an α,β-ethylenically unsaturated carboxylic acid and (c) a copolymer chain extender of an α,β-ethylenically unsaturated monomer copolymerizable with the unsaturated carboxylic acid and the unsaturated surfactant ester.

Of the monomers employed in the preparation of such a surfactant ester copolymer, the α,β-ethylenically unsaturated carboxylic acid contains from about 3 to about 8 carbon atoms and is preferably of the formula:

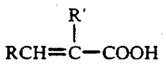

wherein R is —H, —COOX or —$CH_3$, and R' is —H, an alkyl group, preferably having from about 1 to about 4 carbon atoms, or —$CH_2COOX$; wherein X is —H or an alkyl group, preferably having from about 1 to about 4 carbon atoms. Preferably, if R is —COOX, R' is —H or —$CH_2COOX$ and if R is $CH_3$, the R' is H. Most preferably, the unsaturated acid is acrylic or methacrylic acid or a mixture of acrylic or methacrylic acid with itaconic or fumaric acid. Less preferably, crotonic and aconitic acid and half esters of these and other polycarboxylic acids such as maleic acid with $C_1$–$C_4$ alkanols are advantageously employed herein, particularly if used in combination with minor amounts of acrylic or methacrylic acids.

The nonionic surfactant esters of polyoxyalkylene derivatives of an α,β-ethylenically unsaturated carboxylic acids can be represented by the formula:

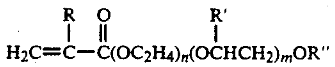

where R is —H or —$CH_3$; R' is —H or an alkyl group having 1 or 2 carbon atoms, R" is an alkyl group having from about 1 to about 20 carbon atoms, or an alkylphenyl group having from about 8 to about 16 carbon atoms, n and m are each integers between about 0 and about 100, wherein the sum of n+m is at least 1, usually from 1 to about 100, preferably from about 6 to about 20 and n is preferably 1 or more and greater than m.

The nonionic chain extender can be a nonionic $\alpha,\beta$-ethylenically unsaturated monomer which is copolymerizable with the unsaturated carboxylic acid and unsaturated surfactant ester and is employed to extend the chain of the surfactant ester copolymer molecule. Preferably, the nonionic chain extender is of the formula:

$$CH_2{=}CAZ$$

where A is —H, —$CH_3$, or a halogen and Z is COOX' where X' is an alkyl group containing from about 2 to about 8 carbon atoms or a hydroxyalkyl group containing from about 1 to 8 carbon atoms; or Z is —$C_6H_4Y'$ wherein Y' is H or an alkyl group having from about 1 to about 4 carbon atoms, —CN, Br, or Cl,

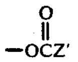

wherein Z' is an alkyl group having from about 1 to about 8 carbon atoms and —CH=$CH_2$. Of such monomers, those employed include the alkyl esters of methacrylic or acrylic acid, preferably wherein the alkyl group has from about 1 to about 8 carbon atoms such as ethyl acrylate, ethyl methacrylate, methyl methacrylate, 2-ethylhexyl acrylate, butyl acrylate and butyl methacrylate, the hydroxyalkyl esters of acrylic and methacrylic acid, and the like.

FLUORESCENT WHITENER OR HYDROTROPE

Fluorescent whiteners should be present in compositions of the invention in amounts from about 0.05 to about 1 wt. %, preferably about 0.1 to about 0.6 wt. %, of the total composition. Fluorescent whiteners (also referred to as optical brighteners, or FWA's) are common commercial products. Such products are fluorescent materials, very often substituted stilbenes and biphenyls, and have the ability to fluoresce by absorbing ultraviolet wavelengths of light and then emitting visible light, generally in the blue wavelength ranges. The whiteners settle out or deposit onto the fabrics during the bleaching or washing process to thereby impart the desired whiteness.

The preferred brighteners in the compositions are those that remain soluble in the formulation below pH 6 and possess sulfonate groups. The distyrylbiphenyl product "Tinopal CBS-X" is one such brightener, and has the structure

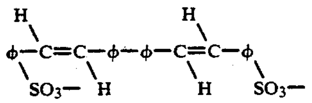

Other soluble brighteners include "Phorwite BBU" and "Phorwite BKL" (available from Mobay Chemicals).

Other non-soluble brighteners such as the 4,4-bis(triazin-2-ylamino)stilbene-2,2'-disulfonic acids, which precipitate out of solution at low pH, are not useful. Examples of these unsuitable brighteners are Tinopal UNPA and Tinopal 5BM (Ciba Giegy).

Table IIA illustrates the importance of including the soluble sulfonate brightener.

TABLE IIA

| Components | Wt. % | pH | Viscosity (cps) |
|---|---|---|---|
| Comparative Composition (d) | | 4.50 | 10 |
| Copolymer[1] | 0.25 | | |
| FWA[2] | 0.00 | | |
| Amine oxide[3] | 0.25 | | |
| $H_2O_2$ | 3.50 | | |
| Optional (nonionic surfactant[4], chelating agent[5]) | (2,0.12) | | |
| Remainder water | | | |

[1]Acrysol RM-5
[2]Tinopal CBS
[3]Ammonyx MCLO
[4]Neodol 25-7
[5]Dequest 2000

Alternatively, such soluble fluorescent brighteners may be entirely replaced or replaced in part with soluble hydrotropes having sulfonate groups as in Table IIB.

TABLE IIB

| Components | Wt. % | pH | Viscosity (cps) |
|---|---|---|---|
| Comparative Composition (e) | | 5.00 | 356 |
| Copolymer[1] | 0.25 | | |
| Soluble Hydrotrope[2] | 0.25 | | |
| Amine oxide[3] | 0.25 | | |
| $H_2O_2$ | 3.50 | | |
| Optional (nonionic surfactant[4], chelating agent[5]) | (2,0.12) | | |
| Remainder water | | | |

[1]Acrysol RM-5
[2]Sodium xylene sulfonate
[3]Ammonyx MCLO
[4]Neodol 25-7
[5]Dequest 2000

As may be seen from the data of Table IIB, a soluble hydrotrope with sulfonate groups, such as sodium xylene sulfonate, benzene sulfonates, or lower alkylaryl sulfonates, provides an adequately thickened acidic composition of the invention. By contrast, use of a sulfate surfactant rather than the necessary soluble sulfonate brightener or hydrotrope does not result in a thickened composition, as may be seen from the data of Table IIC.

TABLE IIC

| Components | Wt. % | pH | Viscosity (cps) |
|---|---|---|---|
| Inventive Composition (f) | | 5.00 | 22 |
| Copolymer[1] | 0.25 | | |
| Sulfate Surfactant[2] | 0.25 | | |
| Amine oxide[3] | 0.25 | | |
| $H_2O_2$ | 3.50 | | |
| Optional (nonionic surfactant[4], chelating agent[5]) | (2,0.12) | | |
| Remainder water | | | |

[1]Acrysol RM-5
[2]Sodium lauryl sulfate
[3]Ammonyx MCLO
[4]Neodol 25-7
[5]Dequest 2000

Amphoteric Surfactant or Amine Oxide

The amphoteric surfactant or amine oxide component should be present in amounts from about 0.1 wt. % to about 5 wt. %, more preferably from about 0.25 wt. % to about 2 wt. % of the total composition. Amphoteric surfactants contain both an acidic and a basic hydrophilic group. Examples of amphoteric surfactants are amino acids and their derivatives, imidazolinium derivatives, and alkyl betaines. Alkyl betaines have the general structure $$R-\overset{+}{N}(CH_3)_2CH_2CO_2^-$$

and R may be an alkyl having from about 8 to about 24 carbon atoms. Suitable amphoteric surfactants are described in *Kirk-Othmer Encyclopedia of Chemical Technology,* 3rd Edition, Vol. 22, pp. 384–387 (1983), the disclosure of which is incorporated herein by reference.

Amine oxides have the structure

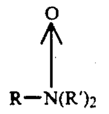

where R is an alkyl group from about 8 to about 24 carbon atoms or an alkyloxypropyl group where the alkyl group has from about 8 to about 24 carbon atoms. R' is a methyl or 2-hydroxyethyl group. Suitable amine oxides are described in *Kirk-Othmer*, pp. 379–380.

Tables IIIA-B illustrate uses of several different amine oxides in preparing compositions of the invention. Table IIIC illustrates use of a betaine rather than an amine oxide.

TABLE IIIA

| Components | Wt. % | pH | Viscosity (cps) |
|---|---|---|---|
| Inventive Composition (a) | | 4.80 | 396 |
| Copolymer[1] | 0.25 | | |
| FWA[2] | 0.26 | | |
| Amine oxide[3] | 1.00 | | |
| $H_2O_2$ | 3.50 | | |
| Optional (non-ionic surfactant[4], chelating agent[5]) | (2,0.12) | | |
| Remainder water | | | |
| Inventive Composition (b) | | 4.80 | 352 |
| Copolymer[1] | 0.25 | | |
| FWA[2] | 0.26 | | |
| Amine oxide[6] | 1.00 | | |
| $H_2O_2$ | 3.50 | | |
| Optional (non-ionic surfactant[4], chelating agent[5]) | (2,0.12) | | |
| Remainder water | | | |

[1]Acrysol RM-5
[2]Tinopal CBS
[3]Ammonyx MCO (Stepan Co.)
[4]Neodol 25-7
[5]Dequest 2000
[6]Ammonyx MO (Stepan Co.)

TABLE IIIB

| Components | Wt. % | pH | Viscosity (cps) |
|---|---|---|---|
| Inventive Composition (a) | | 4.90 | 314 |
| Copolymer[1] | 0.25 | | |
| FWA[2] | 0.26 | | |
| Amine oxide[3] | 1.00 | | |
| $H_2O_2$ | 3.50 | | |
| Optional (non-ionic surfactant[4], chelating agent[5]) | (3,0.12) | | |
| Remainder water | | | |
| Inventive | | 4.80 | 66 |

TABLE IIIB-continued

| Components | Wt. % | pH | Viscosity (cps) |
|---|---|---|---|
| Composition (b) | | | |
| Copolymer[1] | 0.25 | | |
| FWA[2] | 0.26 | | |
| Amine oxide[6] | 1.00 | | |
| $H_2O_2$ | 3.50 | | |
| Optional (non-ionic surfactant[4], chelating agent[5]) | (2,0.12) | | |
| Remainder water | | | |

[1]Acrysol RM-5
[2]Tinopal CBS
[3]Ammonyx MCO
[4]Neodol 25-7
[5]Dequest 2000
[6]Barlox 14 (Lonza)

TABLE IIIC

| Components | Wt. % | pH | Viscosity (cps) |
|---|---|---|---|
| Inventive Composition (a) | | 4.6 | 130 |
| Copolymer[1] | 0.10 | | |
| FWA[2] | 0.26 | | |
| Betaine[3] | 0.50 | | |
| $H_2O_2$ | 3.50 | | |
| Optional (non-ionic surfactant[4], chelating agent[5]) | (0.20,0.12) | | |
| Remainder water | | | |
| Inventive Composition (b) | | 3.70 | 248 |
| Copolymer[1] | 0.50 | | |
| FWA[2] | 0.26 | | |
| Betaine[3] | 1.00 | | |
| $H_2O_2$ | 3.50 | | |
| Optional (non-ionic surfactant[4], chelating agent[5]) | (0.20,0.12) | | |
| Remainder water | | | |

[1]Acrysol RM-5
[2]Tinopal CBS
[3]Lonzaine 16S (Lonza)
[4]Neodol 25-7
[5]Dequest 2000

OPTIONAL COMPONENTS

Non-Ionic Surfactants

Nonionic surfactants provide a cleaning benefit and also tend to increase the translucency of the compositions. Nonionic surfactants are preferably selected from the group consisting of $C_{6-18}$ alcohols with 1.15 moles of ethylene oxide per mole of alcohol, $C_{6-18}$ alcohols with 1–10 moles propylene oxide per mole of alcohol, $C_{6-18}$ alcohols with 1–15 moles of ethylene oxide and 1–10 moles of propylene oxide per mole of alcohol, $C_{6-18}$ alkylphenols with 1–15 moles of ethylene oxide or propylene oxide or both, and mixtures of any of the foregoing. Certain suitable surfactants are available from Shell Chemical Company under the trademark Neodōl. Suitable surfactants include Neodol 25-9 ($C_{12-15}$ alcohol with an average 9 moles of ethylene oxide per mole of alcohol). Another suitable surfactant may be Alfonic 1218-70, which is based on a $C_{12-18}$ alcohol and which is ethoxylated with about 10.7 moles of ethylene oxide per mole of alcohol, from Vista Chemical, Inc. These and other nonionic surfactants used in the invention can be either linear or branched, or primary or secondary alcohols. If surfactants used are partially unsaturated, they can vary from $C_{10-22}$ alkyoxylated alcohols, with a minimum iodine value of at least 40, such as exemplified by Drozd et al., U.S. Pat.

No. 4,668,423, incorporated herein by reference. An example of an ethoxylated, propoxylated alcohol is Surfonic JL-80X ($C_{9-11}$ alcohol with about 9 moles of ethylene oxide and 1.5 moles of propylene oxide per mole of alcohol), available from Texaco Chemical Company.

Other suitable nonionic surfactants may include polyoxyethylene carboxylic acid esters, fatty acid glycerol esters, fatty acid and ethoxylated fatty acid alkanolamides, certain block copolymers of propylene oxide and ethylene oxide and block polymers of propylene oxide and ethylene oxide with a propoxylated ethylene diamine (or some other suitable initiator). However, thickened compositions can be prepared without inclusion of a nonionic surfactant, as can be seen from the data of Table IV.

TABLE IV

| Components | Wt. % | pH | Viscosity (cps) |
|---|---|---|---|
| Inventive Composition (a) | | 4.80 | 230 |
| Copolymer[1] | 0.25 | | |
| FWA[2] | 0.26 | | |
| Amine oxide[3] | 4.00 | | |
| $H_2O_2$ | 3.50 | | |
| Optional (nonionic surfactant, chelating agent[4]) | (0,0.12) | | |
| Remainder water | | | |
| Inventive Composition (b) | | 4.80 | 210 |
| Copolymer[1] | 0.50 | | |
| FWA[2] | 0.26 | | |
| Amine oxide[3] | 4.00 | | |
| $H_2O_2$ | 3.50 | | |
| Optional (nonionic surfactant, chelating agent[4]) | (0,0.12) | | |
| Remainder water | | | |

[1]Acrysol ASE 108 (Rohm & Haas)
[2]Tinopal CBS
[3]Barlox 14
[4]Dequest 2000

Bleach

A liquid bleach source may be selected from various types of bleaches such as halogen, peroxygen and peracid bleaches. The thickening system is compatible with any oxidant bleach which can be suspended in it. In general, the bleach must also be compatible with the acid pH necessary to thicken the composition. The bleach must be able to supply to oxidizing species at the acid pH, and should be resistant to degradation thereby. Preferred as bleaches are the peroxygen or peracid bleaches. Peroxygen bleaches are preferred in terms of manufacturing cost, and preferably are added as an aqueous solution. The aqueous bleach is present in an amount sufficient to provide effective bleaching, e.g., from about 0.05 to 50% by weight active, more preferably from about 0.1 to 35% by weight active and most preferably from about 0.5 to 15% by weight active depending on the bleaching species chosen. Peracid bleaches (including monoperacids and diperacids) may be advantageous in terms of bleaching performance. Peracid bleaches, however, must be added in an insoluble form, due to their greater reactivity. Suitable peracid bleaching species include $C_{8-12}$ alkyl peracids especially perazelaic and diperazelaic acids, diperoxydodecanedioic acid (DPDDA), and alkyl monoperosuccinic acid. Peracid bleaching species, and a method for their production, are described in U.S. Pat. No. 4,337,213, issued Jun. 29, 1982, inventors Marynowski et al. DPDDA is particularly preferred for use in the composition of the present invention as it is relatively storage stable and produces desirable bleaching results. Other potential suitable peracids are identified in U.S. Pat. No. 4,391,725, issued Jul. 5, 1983, inventor Bossu. If added, the total peracid may range from about 0.1 to 50, preferably about 0.1–15, most preferably about 2–10 weight percent, and total oxidant present should generally not exceed about 50 weight percent. Halogen bleaches are ordinarily ineffective at acid pH and are therefore not preferred.

The particularly preferred bleach source is hydrogen peroxide, normally supplied as liquid hydrogen peroxide, although other hydrogen peroxide sources may also function satisfactorily. For example, perborate and percarbonate also supply $H_2O_2$ in solution. The peroxide is present in the range of about 0.05–50% by weight active, more preferred is 0.1–35% by weight active, and most preferred is 0.5–15% by weight active. Numerous sources manufacture and/or market hydrogen peroxide on a commercial basis, and one example of a commercial source is the FMC Company of Philadelphia, Pa. Ordinarily the peroxide is purchased as a concentrated aqueous solution, for example a 70% solution, and is diluted with the deionized water to the desired strength.

Bleach Activator

A useful addition to the thickened peroxygen bleaching compositions disclosed herein are insoluble bleach activators, especially peracid activators, also known as peracid precursors. The activators employed in the bleaching compositions of the invention may be characterized as being insoluble at pHs of about 7 or less used for storage (neutral or acidic pH's) and also being about 10–1000 times, preferably 50–1000 times, most preferably 100–1000 times as soluble at pHs of greater than about 7 (alkaline pHs) used in bleaching. Activators which can exhibit this pH-dependent solubility are activators containing weakly acidic groups such as free carboxylic acid groups, sulfonamide groups, thiocarboxylic acid groups, aromatic hydroxyls, aromatic thiols, aromatic anhydrides, cyclic amide groups, and phosphite groups as solubilizers. At acidic pHs such groups are not ionized and contribute to insolubility. At basic pHs these groups become increasingly ionized and solubilize the activator. These groups appear to be uniquely suited as solubilizers in this setting. Sulfonate or phosphonate groups are not acceptable because they are extensively ionized, and lead to extensive activator solubilization at the acidic pH's where nonionization and insolubilization are sought. Quaternary ammonium groups are inappropriate as well as they will tend to form ion pairs with anions present in the wash mixture. Thus, the activators employed herein can be classified as containing ionizable solubilizing groups that are substantially unionized at conditions of storage and substantially ionized at conditions of use, and contain no sulfonate, phosphate or quaternary ammonium groups. Representative suitable solubilizing groups are aromatic and aliphatic carboxylic acids and thioacids and their alkali metal and alkaline earth metal salts, as well as aromatic alcohols and aromatic thiols, aromatic anhydrides, maleimides and sulfonamides.

The peracid precursors used herein may be represented structurally as:

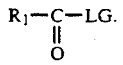

That is, they contain a carbonyl group attached to a leaving group "LG" which is displaced when the peracid forms and "$R_1$" group which is an organic residue of 1 to 20 carbon atoms. The weakly acidic solubilizer group or groups "SG" can be attached to either the $R_1$ or the LG portion of the molecule.

The SG group may be selected from groups such as an aromatic —COOM, a —CSOH, an aromatic —OH—, an aromatic —SH, a compound with the structure

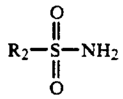

or compounds having the following moieties (where the ○ symbol means an aromatic ring is adjacent, or bonded to, the indicated moiety):

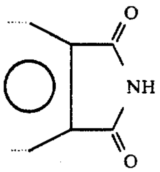

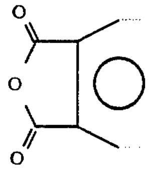

In these typical SG groups structures, $R_2$ is an organic linking or bridging group typically having less than about 8 carbon atoms. Representative $R_2$ groups are alkylenes of from 1 to about 4 carbon atoms, and 6 to 8 carbon arylenes and alkarylenes, such as methylene, ethylene, propylene, butylene, phenylene, phenylene-methylene, and the like. Also in these structures, M is hydrogen, an alkali metal ion or an alkaline earth metal ion such as sodium, potassium, calcium or magnesium. When aromatic groups are present in the SG groups, they can be substituted with alkyls of from 1 to 6 carbon atoms, halogens, e.g., chloros or bromos, acyls of 1 to 4 carbon atoms, other aryls of up to 6 carbon atoms, either pendent or fused, or alkoxies of from about 1 to 6 carbon atoms, if desired. Multiple substitution is possible, as well, if desired.

$R_1$, the $C_{1-20}$ organic residue, an be a hydrocarbon such as a branched or straight chain alkyl or alkenyl, an aryl, an alkaryl or the like, or a substituted hydrocarbon such as an ether or an amine. Typically, $R_1$ may be selected from alkyls and alkenyls of from 1 to about 20 carbon atoms, aryls and aralkyls of from about 6 to 12 carbon atoms, ethers of from about 4 to 6 carbon atoms with 1 to 3 oxygen atoms, and alkyl amines of from about 3 to 8 carbon atoms and 1 amine nitrogen atom. An SG group can be attached to this $R_1$ group, if desired.

LG, the leaving group, is generally an aromatic moiety, in particular, often an aryloxy group of from about 6 to about 12 carbon atoms. Representative LG groups include structures (a) and (b):

(a)

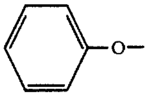

(b)

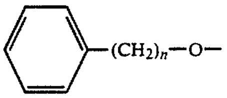

(wherein n equals from 1 to about 4) and the like. In such LG groups, the aromatic ring may be substituted with one or more SG groups and/or with one or more alkyl, halogen, acyl, aryl, or alkoxy groups, if desired.

The activators used in accord with this invention will always include at least one SG group. It is possible for them to contain more than one SG group, for example two, three or four such groups so long as the activators have the required solubility properties. If two or more SG groups are present, they can be the same or different and located in the same region of the activator or in different regions.

Typical activators which would be useful herein because of their insolubility in storage and solubility in use are as shown in structures (c), (d), (e), (f) and (g):

(c)

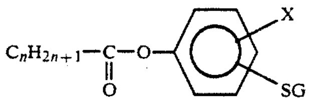

wherein X is hydrogen, $C_{1-4}$ alkyl, acyl or alkoxy, an aryl of about 6 carbon atoms, or a chloro, bromo or iodo; n is 1 to 20; and SG is as defined above;

(d)

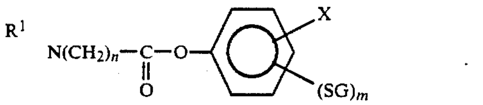

wherein n is 1 to 20, m is 1, 2 or 3, $R^1$ and $R^2$ each are H or $C_zH_{2z+1}$, and z is 1 to 20 and SG is as defined above;

(e)

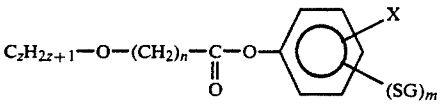

wherein n and z are each 1 to 20, m is 1, 2 or 3, and SG is as defined above;

(f)

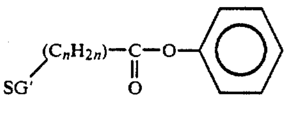

wherein n is 1 to 20, and SG' is a COOm or a COSH, m is 1, 2 or 3; and

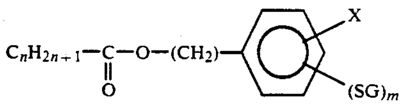

(g)

wherein n is 1 to 20, and m is 1, 2 or 3.

One preferred group of activators can be described structurally as having the formula:

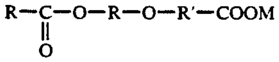

wherein R is an alkyl of 1 to 12 carbon atoms and R' is an arylene group of 6 carbon atoms, optionally with an "X" substituent as above described, which will exert an electron withdrawing effect in the central

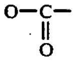

group to promote substitution by perhydroxyl ions ($OOH^-$). M is hydrogen, an alkali metal ion, or an alkaline earth metal ion—usually either $K^+$ or $Na^+$. (If M is a metal ion, when the activator is placed in an acidic medium, the metal ion will immediately be substantially replaced by hydrogen.) Such an activator can undergo the following reactions in pH 7 or greater aqueous media:

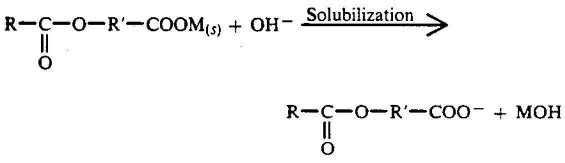

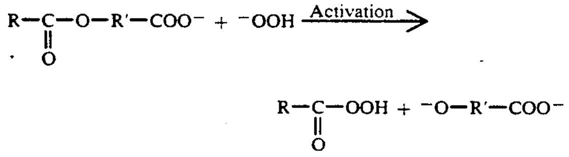

Preferred R groups have from 3 to 10 carbon atoms, more preferred is 5 to 9 carbon atoms, and normal $C_7$ alkyls being the most preferred. R' can preferably be selected from 6 to 10 carbon atom arylenes which optimally contain up to two alkyl substituents totalling up to 8 carbon atoms. Phenylene is the most preferred R' group in this class of activator.

Taking the above-defined preferences into account one can define a more preferred group of activators as having the following formula (h):

(h)

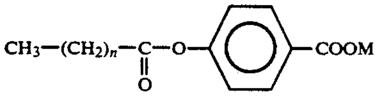

wherein n is an integer from 2 to 8, especially 4 to 8 and more preferably about 6, and M is hydrogen, $NA^+$ or $K^+$. The COOM group can be at various positions on the aromatic ring, with the position para to the —O— link being preferred.

The above described activators can be produced by methods known in the art. One generally applicable process for forming the:

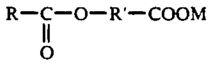

activators involves first forming an anhydride of the formula:

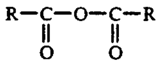

by condensing two molecules of:

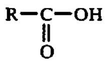

acid in the presence of excess acetic anhydride under dehydration conditions, and then, reacting the anhydride so formed with a hydroxy-substituted acid of the formula:

$HO-R'-COOM$ generally in the presence of strong acid. An alternative process proceeds through acid chlorides. Other synthetic processes can be found in published European application 105,673, dated Apr. 18, 1984 (Hardy et al.); *Kirk-Othmer Encyclopedia of Chemical Technology,* 3d. Ed., Vol. 22, p. 348; and Rabjohn, *Organic Synthesis,* Vol. 4, pp. 635-638 (1963). The activators can be recovered as solids and are used as particulate solids in the compositions of this invention. They are generally ground or otherwise divided to a size of about 140 mesh or smaller, preferably to a size of 500 microns or less to facilitate their dispersal and suspension in the bleach composition.

The solid activator is added in amounts of from about 0.1 to about 10.0 moles per mole of hydrogen peroxide. Since the activator is more expensive than hydrogen peroxide it is preferred for economic reasons not tó use large excesses of activator so that amounts of from 0.2 to 2 moles of activator per mole of hydrogen peroxide, and especially 0.3 to 1 mole of activator per mole of hydrogen peroxide, are preferred.

A particularly preferred bleach activator for the thickened peroxygen bleaching compositions herein is a p-(n-octanoyloxy) benzoic acid (OBA) having the following structure (i):

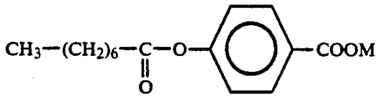

To ensure stable suspension of the precursor, it should have a particle size range on the order of about 0.01-100 microns, most preferably 0.01-10 microns. This can be accomplished by any means knownin the art such as mechanical means including milling or grinding. When placed in an alkaline wash (or rinse) medium, the peracid precursor becomes soluble, and forms its corresponding peracid.

Stabilizing System

The stabilizing system comprises an antioxidant or a chelating agent. It is thought that the chelating agent acts to sequester heavy metal cations, especially polyvalent metals such as copper and iron which are always present in small amounts among the mineral components in water. These heavy metal cations normally have the ability to catalyze peroxide homolysis and to mediate free-radical generation. These capabilities are inhibited by the chelating agent. The stabilizing system also includes an antioxidant which appears to work by tying up free-radicals initially formed in the solution, removing the ability of free-radicals to degrade organic components and also stopping the self-propagating free-radical cascade reaction. By such a mechanism, destruction of the surfactants, fluorescent whitener and optional oxidizable components (e.g., fragrance and dye) is arrested or reduced. Both the chelating agent and antioxidant should be present to attain the desired stability of the peroxide bleaching composition. However, less preferred embodiments of the invention can omit either the chelating agent or antioxidant or both.

The chelating agent may be selected from a number of known agents which are effective in chelating heavy metal cations. The chelating agent should be resistant to hydrolysis and oxidation by oxidants. Preferably it should have an acid dissociation constant (pKa) of about 1-9, indicating that it dissociates at low pHs to enhance bonding to metal cations. The most preferred chelating agent is a polyphosphonate which is commercially available under the trademark "Dequest" and sold by the Monsanto Company. Specific examples of effective Dequest products include Dequest 2000, Dequest 2010, Dequest 2041 and Dequest 2060.

Other related chelating agents such as pyrophosphates may also be utilized. EDTA-type chelating agents will also perform well. The chelating agent should be present in an amount sufficient to tie up any heavy metal cations present in the solution. The preferred range is 0.02 to 5% by weight, more preferred 0.04 to 3% by weight, and most preferred is 0.06 to 1.0% by weight.

The antioxidant functions as a free-radical scavenger. Preferred for this purpose are substituted phenols, or more broadly, hydroxy benzenes. Of this class of compounds, butylated hydroxy toluene (BHT) and mono-t-butyl hydroquinone (MTBHQ) have been found to be especially effective. The antioxidant must resist oxidation by $H_2O_2$ and therefore cannot be too strong a reducing agent. It is also desirable that the antioxidant hydroxy benzenes be partially hindered, i.e., having a substituent alkyl or similar group attached to some of the reactive sites on the ring structure. It is necessary to block some of the reactive sites so that reactions with multiple available free-radicals resulting in polymerization and possible phase separation do not occur. BHT and MTBHQ satisfy all the above criteria and are therefore preferred as antioxidants. BHT is commercially available from the Uniroyal Chemical Company, while MTBHQ is commercially available from the Eastman Chemical Company. Only very small amounts of antioxidant are necessary in the bleach composition. A preferred range is about 0.005-0.4% by weight, more preferred is 0.007-0.03% by weight, and most preferred is 0.01-0.02% by weight.

Other Optional Ingredients

The peroxide bleaching composition may include small amounts of components such a fragrances, commercially available from, for example, International Flavors and Fragrances, and dyes such as acid blue. It is also contemplated that fluorescent whitening agents or dyes which do not fall within the thickening-effective classification could be added to perform only their whitening or dying function. Thickening-effective fluorescent whitening agents would, of course, be present to both thicken and whiten, and the extra fluorescent whitening agents would serve to increase brightening without increasing thickening. The balance of the formulation is, of course, water. It is preferred for stability purposes to use deionized or distilled water to reduce metal ion contaminates to as low a level possible. It may be noted, however, that even with metal ion contamination of 2-10 ppm or more, the stabilizing system of the present invention remains effective.

pH CONTROL AND EFFECTS

Compositions of the invention are stable with relatively small amounts of surfactants, such as the optional nonionic surfactant and the amphoteric surfactant as an alternative to amine oxide. These stable compositions show an increase in viscosity as the pH is decreased below about 6, as shown in Table V.

TABLE V

| Components | Wt. % | pH | Viscosity (cps) |
|---|---|---|---|
| Inventive Composition (a) | | 4.8 | 230 |
| Copolymer[1] | 0.25 | | |
| FWA[2] | 0.26 | | |
| Amine oxide[3] | 4.00 | | |
| $H_2O_2$ | 3.50 | | |
| Optional (non-ionic surfactant, chelating agent[4]) | (0,0.12) | | |
| Remainder water | | | |
| Inventive Composition (b) | | 2.2 | 164 |
| Copolymer[5] | 0.50 | | |
| FWA[2] | 0.26 | | |
| Amine oxide[3] | 1.00 | | |
| $H_2O_2$ | 3.50 | | |
| Optional (non-ionic surfactant[6], chelating agent[4]) | (4,0.12) | | |
| Remainder water | | | |

[1]Acrysol ICS-1
[2]Tinopal CBS
[3]Barlox 14
[4]Dequest 2000
[5]Acrysol RM-5
[6]Neodol 25-7

By contrast to the acceptable viscosities for the inventive compositions (a) and (b) shown in Table V, when the pH for inventive composition (a) was 6.6, then viscosity fell to 48 and when the pH for inventive composition (b) was 6.5, then the viscosity fell to 10.

PARTICULARLY PREFERRED EMBODIMENTS OF THE INVENTION

Table VI illustrates particularly preferred examples. These compositions are stable after two weeks at 120° F. and also to freeze-thaw. It can be seen that the hydrophobically modified thickeners, Acrysol RM-5 and Acrysol ICS-1, provided greater thickening and clearer formulations, as indicated by lower turbidity, then Acrysol ASE 108.

These compositions can be prepared by mixing the surfactant, polymer and brightener or other sulfonate together at near neutral pH. Then the bleach, chelating agent and any other optional ingredients are mixed in. Finally, the pH of the composition is adjusted to the desired level.

TABLE VI

| | | Viscosity, cps | Turbidity, NTU |
|---|---|---|---|
| 2.0% | Neodol 25-7 | 426 | 80 |
| 1.0% | Ammonyx MCLO | | |
| 0.25% | Acrysol RM-5 | | |
| 0.26% | Tinopal CBS | | |
| 3.5% | Hydrogen Peroxide | | |
| 0.12% | Dequest 2000 | | |
| 2.0% | Neodol 25-7 | 560 | 215 |
| 1.0% | Ammonyx MCLO | | |
| 0.25% | Acrysol ICS-1 | | |
| 0.26% | Tinopal CBS | | |
| 3.5% | Hydrogen Peroxide | | |
| 0.12% | Dequest 2000 | | |
| 2.0% | Neodol 25-7 | 276 | 396 |
| 1.0% | Ammonyx MCLO | | |
| 0.25% | Acrysol ASE 108 | | |
| 0.26% | Tinopal CBS | | |
| 3.5% | Hydrogen Peroxide | | |
| 0.12% | Dequest 2000 | | |

Although the present invention has been described with reference to specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

It is claimed:

1. A thickened substantially clear aqueous acid solution having a pH below about 6 useful as a laundering aid comprising:

a thickener for the aqueous solution dissolved therein and in an amount effective to thicken the aqueous solution without substantially reducing the clarity thereof, the thickener consisting essentially of (a) a copolymer of α,β-ethylenically unsaturated carboxylic acid and one or more ethylenically unsaturated monomers copolymerizable therewith, (b) an acid soluble fluorescent whitener having sulfonate groups, and (c) from about 0.1 wt. % to about 5 wt. % with respect to the total composition of an amphoteric surfactant or an amine oxide.

2. The liquid composition as in claim 1 wherein the aqueous solution includes a bleaching agent therein.

3. The liquid composition as in claim 2 wherein the bleaching agent is a source of peroxide in a bleach effective amount.

4. The liquid composition as in claim 1 optionally including from about 0 wt. % to about 3 wt. % nonionic surfactant.

5. The liquid composition as in claim 3 wherein the fluorescent whitener is replaced in part with from greater than about 0.1 wt. % to about 3 wt. % soluble hydrotrope having sulfonate groups.

6. The liquid composition as in claim 1 wherein the copolymer is from about 0.01 wt. % to about 1 wt. % of the total composition.

7. The liquid composition as in claim 5 wherein the fluorescent whitener is from about 0.05 wt. % to about 1 wt. % of the total composition.

8. The liquid composition as in claim 1 or 6 wherein the copolymer is derived from the α,β-ethylenically unsaturated carboxylic acid and an alkyl ester thereof.

9. The liquid composition as in claim 8 wherein the copolymer is derived from methacrylic acid or acrylic acid and a methacrylic or acrylic acid ester.

10. The liquid composition as in claim 1 wherein the amphoteric surfactant is a betaine having the structure

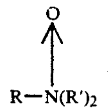

wherein R is an alkyl group having 8 to 24 carbon atoms.

11. The liquid composition as in claim 1 wherein the amine oxide has the structure $$R-\overset{+}{N}(CH_3)_2CH_2CO_2-$$

wherein R is an alkyl group having 8 to 24 carbon atoms and R' is a methyl or 2-hydroxyethyl group.

12. The liquid composition as in claim 1 wherein the bleaching agent includes a peracid precursor and a source of peroxide.

13. The liquid composition as in claim 1 wherein the copolymer is derived from monomers including either: (a) about 20–50 wt. % methacrylic acid or acrylic acid, about 0–25 wt. % acrylic or methacrylic acid ester of a $C_8$–$C_{30}$ alkyl, alkylaryl or polycyclic hydrocarbyl monoether of a polyethylene glycol having at least two oxyethylene units, and at least about 30 wt. % of a $C_1$–$C_4$ alkyl acrylate or methacrylate; or (b) an α,β-ethylenically unsaturated carboxylic acid, a nonionic surfactant ester of a polyoxyalkylene derivative of an α,β-ethylenically unsaturated carboxylic acid and optionally a copolymer chain extender of an α,β-ethylenically unsaturated monomer.

14. The liquid composition as in claim 13 wherein the amphoteric surfactant is a betaine having the structure $R—N^+(CH_3)_2CH_2CO_2^-$ where R is an alkyl group having 8 to 24 carbon atoms.

* * * * *

UNITED STATES PATENT AND TRADEMARK OFFICE

CERTIFICATE OF CORRECTION

PATENT NO. : 5,149,463

DATED : September 22, 1992

INVENTOR(S) : David Peterson

It is certified that error appears in the above-identified patent and that said Letters Patent is hereby corrected as shown below:

Column 18, line 25, in Claim 10 delete the structure shown and replace with

-- $R-\overset{+}{N}(CH_3)_2CH_2CO_2^-$ --.

Column 18, line 35, in Claim 11 delete the structure shown and replace with

-- $R-\overset{\overset{O}{\uparrow}}{N}(R')_2$ --

Signed and Sealed this

Second Day of November, 1993

Attest:

BRUCE LEHMAN

*Attesting Officer* *Commissioner of Patents and Trademarks*